UNITED STATES PATENT OFFICE.

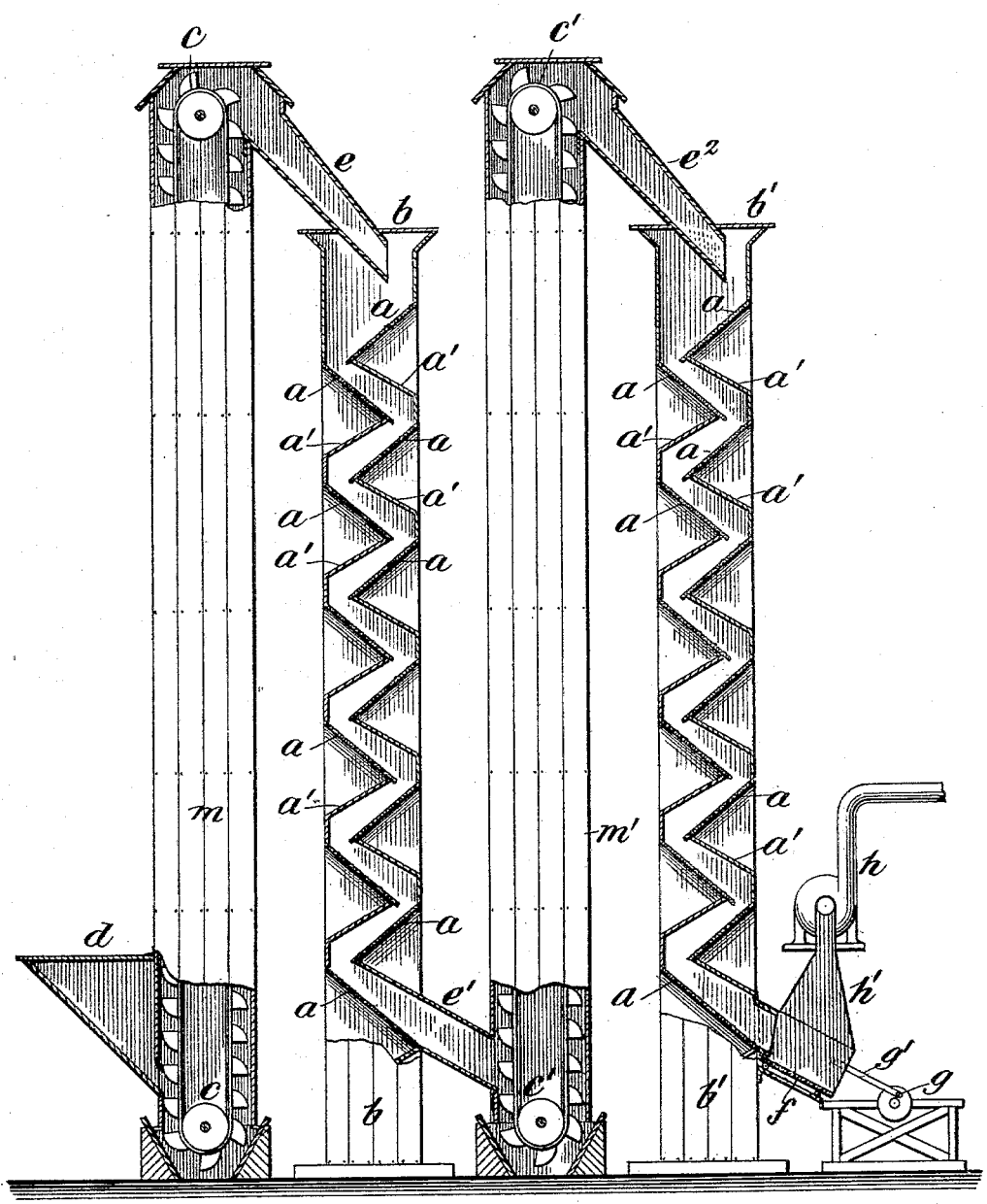

GEORGE PETTIT, JR., OF FRESNO, CALIFORNIA.

STEMMING AND CLEANING FRUIT.

SPECIFICATION forming part of Letters Patent No. 603,029, dated April 26, 1898.

Application filed June 9, 1897. Serial No. 639,972. (No model.)

*To all whom it may concern:*

Be it known that I, GEORGE PETTIT, Jr., a citizen of the United States, and a resident of Fresno, in the county of Fresno and State of California, have invented certain new and useful Improvements in Stemming and Cleaning Fruit, of which the following is a specification, reference being had to the accompanying drawing, forming part hereof.

This invention relates to stemming and cleaning fruit or berries, such as raisins and currants, and has for its object to detach the stems from the berries and to separate the detached stems and other material from the berries.

The operation of breaking off and separating the stems, and especially the short stems or butt-stems, is one of the most difficult operations in the preparation of raisins or currants for the market. The method and apparatus heretofore employed to that end have aimed to perform the work of detaching the stems by violent agitation of a mass of berries and have performed the work very imperfectly, requiring to be supplemented by considerable hand labor in picking off and removing the stems and separating other material from the berries. The pulp of the berries being of an adhesive nature, violent agitation or severe concussions cause this pulp to exude, and the result is not only that the berries adhere together and the apparatus is liable to become clogged, but also that the stems which have been broken off from their points of attachment to the berries are liable to adhere to the surface of the berries in such a manner that their separation can only be performed by hand work, and other materials also adhere to the berries and require like separation. According to my invention the berries are caused under the action of gravity to move over an inclined sieve-surface of sufficient fineness to exclude the whole fruit. In thus passing over the sieve-surface they are in a thin and nearly or substantially single layer, so that the pressures upon the surface of any particular berry are slight, and as the berries move over the inclined sieve-surface and into contact with each other the stems are broken off and detached from the berries and drop through the sieve-openings and are thus separated from the berries. This sieve-surface is of considerable length, and the breaking off of the stems from contact with the berries is usually the result of a succession of contacts with the sieve or with adjacent berries. At no part of this operation are the berries subjected to violent concussions or heavy pressures. After the berries have passed over a sufficient length of the inclined sieve-surface, as above described, to break off or detach all of the stems I subject the berries to a strong upward current of air, which has the effect of removing all light particles mixed with the berries that have not been separated therefrom in the sieving treatment. Thus the berries are effectually stemmed and cleaned and at the conclusion of this treatment are ready for the market as stemmed or cleaned fruit or are suitably prepared, so far as concerns the removal of the stems and other material therefrom, for a subsequent seeding or seed-removing operation. When this seeding operation is to be performed by machinery, as is usually now desirable, it is of great importance that the stemming and cleaning of the berries should have been effectually performed, as otherwise the seeding operation may be ineffective or the seeding-machines may be injured by foreign material, such as gravel, sticks, or stones.

My invention also includes various improvements in apparatus for stemming and cleaning the fruit, which will now be particularly described, referring to the accompanying drawing, which illustrates, partly in side elevation and partly in vertical section, an apparatus embodying my invention.

In the apparatus as shown the stemming-sieves $a$ are arranged in two vertical shafts or columns $b\ b'$ of considerable height, and the sieves $a$ of each shaft are inclined, so that the berries will move over their surfaces under the action of gravity. The inclination of these sieves is shown as at an angle of about forty degrees, and this inclination I have found gives excellent results in practice. All of the sieves or riddles $a$ are of a mesh sufficiently fine to exclude the whole fruit. The inclined sieves in each shaft are arranged at short distances one from another, and adjacent sieves are inclined in opposite directions. Beneath each sieve $a$ is an inclined deflecting-board $a'$, which receives any material that has passed through the sieves and discharges it at the outer wall of the sieve-shaft.

In some cases it may be desirable to arrange the sieves or riddles in a single vertical shaft, or it may be desirable to increase the number of shafts beyond that shown, depending upon the length of sieving-surface required and the height of the shaft available.

The movement of the berries over the sieve-surface is caused by gravity, the berries being merely poured or emptied upon the upper sieve of a sieve-shaft in such limited or regulated quantities as will insure their passage over the sieve-surface in a thin layer. The detachment of the stems from the berries is effected by contact one with another and with the sieve-surface, and the separated stems and dirt and broken particles of berries and other material which pass through the sieves fall upon the deflecting-boards $a'$ and are discharged down outside of the sieve-shaft, while the whole berries move over the surface of the sieves and from sieve to sieve until they have moved over and off from the lower sieve of the shaft.

For the purpose of elevating the berries to the top of the shaft or of each shaft and of pouring them upon the sieves in regulated quantities I provide elevators $c\ c'$, one for each shaft, each elevator being composed of a number of buckets arranged in a continuous chain and the elevators being shown as incased within suitable shafts $m$ and $m'$, respectively. The first of these elevators $c$ is fed from a hopper or inclined chute $d$, into which the berries are poured about as rapidly as they will be taken up by the buckets of the elevators. When a bucket laden with berries reaches the top of the elevator-shaft and passes over the center, its contents are poured upon the inclined chute $e$, down which they are moved by gravity and from which they fall upon the upper sieve $a$ of the first sieve-shaft $b$. From the lower sieve $a$ of this shaft the berries are discharged through the chute $e'$ into the buckets of the second elevator $c'$, and from the upper end of this elevator they pass by an inclined chute $e^2$ to the upper sieve $a$ of the second sieve-shaft $b'$. When the berries reach the lower sieve of the second sieve-shaft, the stemming of the berries will have been effectually completed and also the separation of the stems and other material that will pass through the sieves or riddles; but to effectually separate all undesirable material therefrom—such, for example, as long stems that have not passed through the sieves or riddles or berries so thoroughly dried as to be useless—I cause the berries to pass from this lower sieve onto a vibrating sieve $f$, shown as longitudinally reciprocated by a crank-pin $g$ and pitman $g'$, and as the berries are passing over this vibrating sieve I subject them to a strong upward current of air, shown as produced by an exhausting-blower $h$ and drawn upward through the flue $h'$, the air-current being insufficient to lift the whole normal berries up into the flue $h'$, but removing the lighter material therefrom, and the action of the air-current being supplemented by the agitation of the berries through the vibrations of the sieve $f$. From the vibrating sieve $f$ the cleaned and stemmed berries may drop into a suitable receptacle. (Not shown.)

Prior to the cleaning and stemming of the berries, as above described, it is desirable that they should be dried and then brought to a somewhat brittle condition by cooling. At the conclusion of the cleaning and stemming they are ready for the market as cleaned and stemmed fruit, or ready, so far as cleaning and stemming are concerned, for a subsequent seeding operation, which may be performed by machinery.

It is evident that the apparatus above particularly described may be modified in construction within the purview of my invention and that slight modifications of procedure may be made without departing from my invention.

What I claim, and desire to secure by Letters Patent, is—

The process of detaching and separating the stems from fruit and cleaning the fruit which consists in causing the fruit under the action of gravity to move in a thin layer over an inclined elongated sieve-surface of sufficient fineness to exclude the whole fruit, substantially as set forth.

Signed at Fresno, in the county of Fresno and State of California, this 27th day of May, A. D. 1897.

GEORGE PETTIT, JR.

Witnesses:
E. J. BABER,
C. E. TEAVES.